(12) United States Patent
Kumar et al.

(10) Patent No.: US 8,085,710 B2
(45) Date of Patent: Dec. 27, 2011

(54) MINIMIZING PACKET LOSS DURING FAST ROAMING

(75) Inventors: Rajneesh Kumar, San Jose, CA (US); Robert B. O'Hara, Jr., Santa Clara, CA (US); Kalyan Dharanipragada, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1134 days.

(21) Appl. No.: 11/844,255

(22) Filed: Aug. 23, 2007

(65) Prior Publication Data

US 2009/0052412 A1    Feb. 26, 2009

(51) Int. Cl.
*H04W 4/00*    (2009.01)
(52) U.S. Cl. ......... 370/328; 370/331; 370/338; 455/437
(58) Field of Classification Search .................. None
See application file for complete search history.

(56) References Cited

U.S. PATENT DOCUMENTS

| | | | |
|---|---|---|---|
| 7,085,576 B2 | 8/2006 | Ranganathan | |
| 7,424,295 B2* | 9/2008 | Isobe et al. | 455/436 |
| 2003/0058853 A1* | 3/2003 | Gorbatov et al. | 370/389 |
| 2004/0025047 A1* | 2/2004 | Mayne et al. | 713/200 |
| 2004/0192342 A1* | 9/2004 | Ranganathan | 455/456.1 |
| 2005/0143072 A1* | 6/2005 | Yoon et al. | 455/436 |
| 2007/0104179 A1* | 5/2007 | Srinivasan et al. | 370/351 |
| 2007/0248049 A1* | 10/2007 | Fajardo et al. | 370/331 |

OTHER PUBLICATIONS

Perkins, Colin, et al., "A Survey of Packet-Loss Recovery Techniques for Streaming Audio." Department of Computer Science, University College London, Aug. 10, 1998.
Lee, W.S., et al., "A Robust Codec for Transmission of Very Low Bit-rate Video Over Channels with Bursty Errors," School of Electrical Engineering, University College, The University of New South Wales, International Conference on Image Processing, Santa Barbara, Oct. 26-29, 1997.

* cited by examiner

*Primary Examiner* — Anthony Sol
(74) *Attorney, Agent, or Firm* — Baker Botts L.L.P.

(57) ABSTRACT

A packet loss reduction system. In particular implementations, a method includes responsive to indications of roaming intent of a wireless client relative to currently associated wireless access point, determining if a traffic stream associated with the wireless client is to be proactively buffered by one or more potential wireless access points; conditionally transmitting a command to the one or more potential wireless access points to cause the potential wireless access points to set up resources to proactively buffer packets of the traffic stream; duplicating received packets of the traffic stream destined for the wireless client; and transmitting the duplicate packets to the potential wireless access points for storage in a proactive stream buffer.

16 Claims, 10 Drawing Sheets

MINIMIZING PACKET LOSS DURING FAST ROAMING

TECHNICAL FIELD

The present disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

With some applications involving Quality of Service (QoS) traffic streams, such as voice traffic streams or video traffic streams, dropped packets may be problematic, as a significant number of chopped packets may degrade the quality of the traffic streams. When voice or video traffic is being transmitted over a wireless network, there is the added complexity that arises from user mobility. Because wireless clients may often roam between several wireless access points during the course of a session, packets may be dropped during roaming, which may adversely affect the quality of the end-user experience.

DESCRIPTION OF EXAMPLE EMBODIMENTS

A. Overview

Particular implementations facilitate wireless roaming in wireless networks. According to particular implementations, the present invention minimizes packet loss by proactively duplicating packets of traffic streams and sending the duplicate packets to potential wireless access points to which the wireless client may roam. In one implementation, the duplication process may be triggered by a roaming intent event such as a detection of a pre-reservation process initiated by the wireless client. In particular implementations, a given potential wireless access point that receives duplicate packets associated with the wireless client will not send the duplicate packets over the air to the wireless client until after associating with the wireless client. After receiving the duplicated packets, the potential wireless access point will store the duplicate packets in a proactive stream buffer until the wireless client actually associates with the given wireless access point. If and when a given wireless access point actually associates with the wireless client, the wireless access point merges the duplicate packets stored in its proactive stream buffer into the appropriate transmission queues. In one implementation, a wireless access point will expire or age out any stored duplicate packets after a predefined age-out time. The age-out mechanism ensures that each proactive stream buffer of each wireless access point does not store stale packets.

B. Example Wireless Network System Architecture

B.1. Network Topology

Figure 1A:
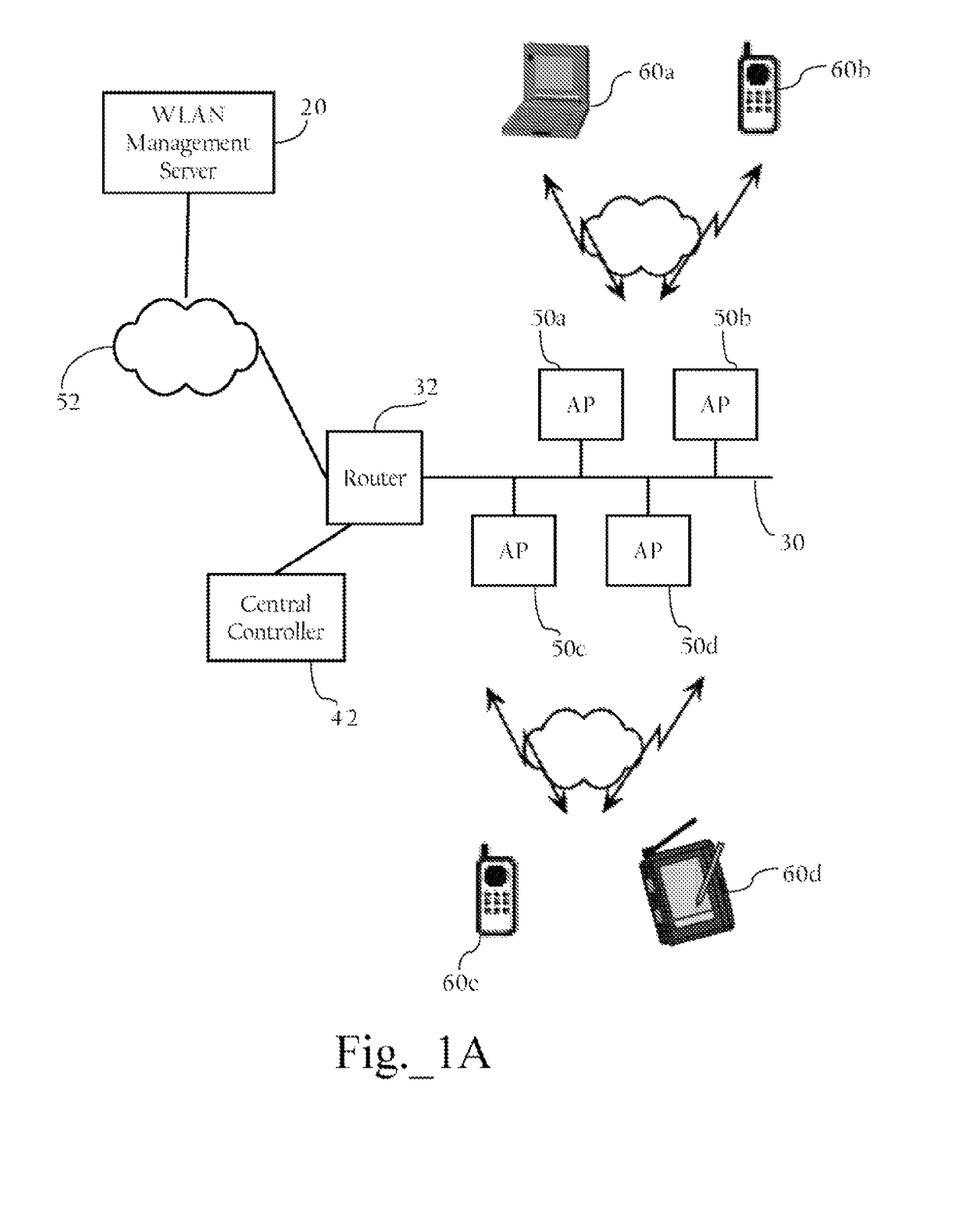
FIG. 1A illustrates example components in a wireless local area network (WLAN) system.

FIG. 1A illustrates example components in a wireless local area network (WLAN) system. In a specific embodiment of the present invention, the system includes a WLAN management server 20, a central controller 42, a local area network (LAN) 30, a router 32, and wireless access points 50a, 50b, 50c, and 50d. LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is Illustrated as being on a different LAN or LAN segment, it may be co-located with wireless access points 50.

Figure 1B:
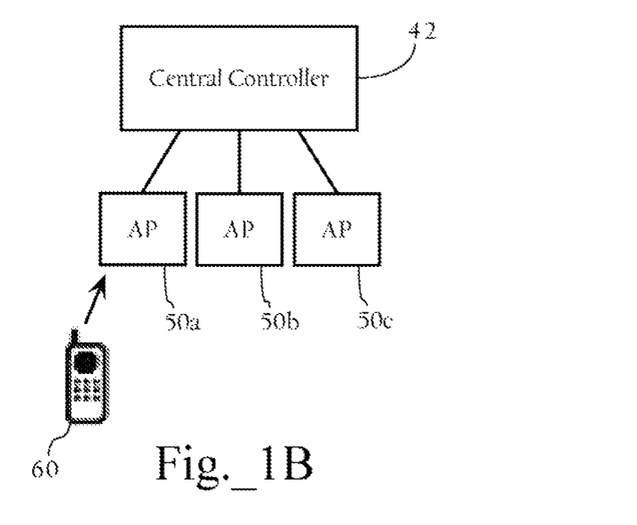
FIG. 1B illustrates an example hierarchical wireless network including a central controller.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates an example hierarchical wireless network including a central controller 42 according to one implementation of the present invention. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with lightweight wireless access points and process wireless protocol and network management information. As FIG. 1B illustrates, a central controller 42 may be directly connected to one or more access points 50. Alternatively, a central controller 42 may be operably connected to one or more access points over a switched and/or routed network environment, as FIG. 1A illustrates.

Figure 1C:
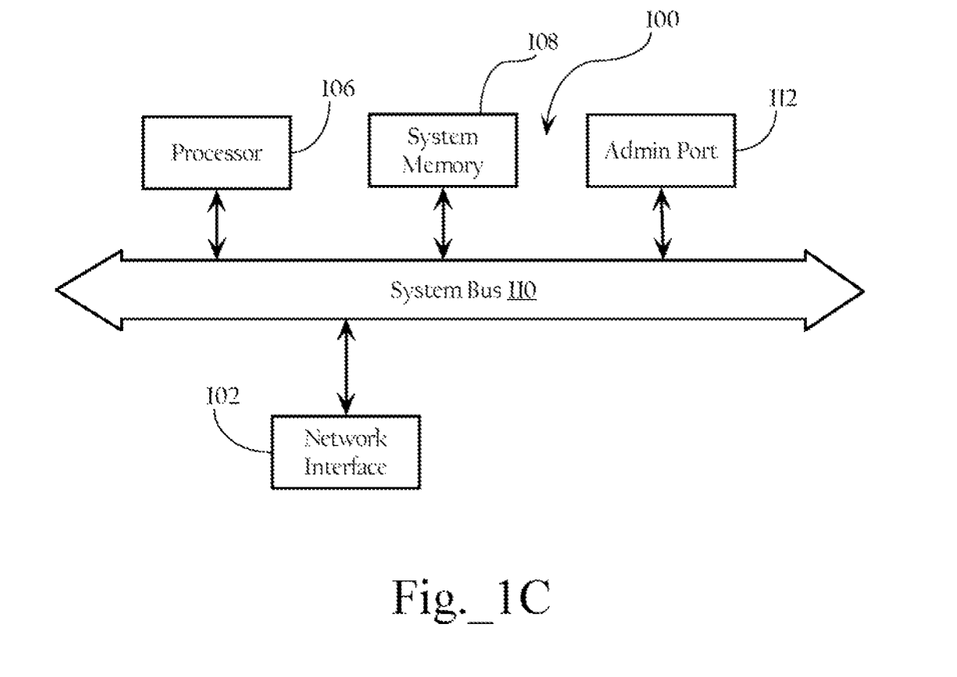
FIG. 1C illustrates an example hardware system, which may be used to implement a central controller.

FIG. 1C illustrates an example hardware system 100, which may be used to implement a controller 42. As FIG. 10 shows, in one implementation, the central controller 42 includes a network interface 102. Controller 42, in one implementation, further comprises a processor 106, a memory 108, one or more software modules stored in memory 108, including instructions for performing the functions described herein, and a system bus 110 operably connecting these components. The central control elements may optionally include an administrative port 112 allowing for administrative access for such purposes as configuration and diagnostic access.

B.3. Wireless Access Point

Figure 2:
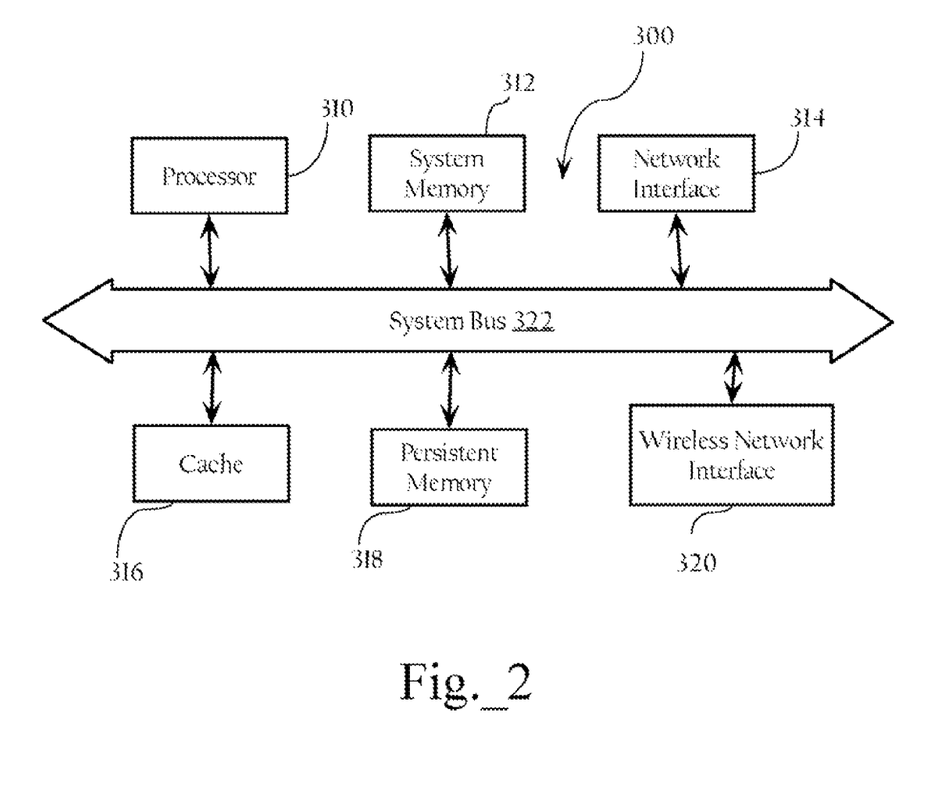
FIG. 2 illustrates an example hardware system, which may be used to implement a wireless access point.

FIG. 2 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point. Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

C. Basic Wireless Network Environment Illustrating a Potential Roaming Event

Figure 3:
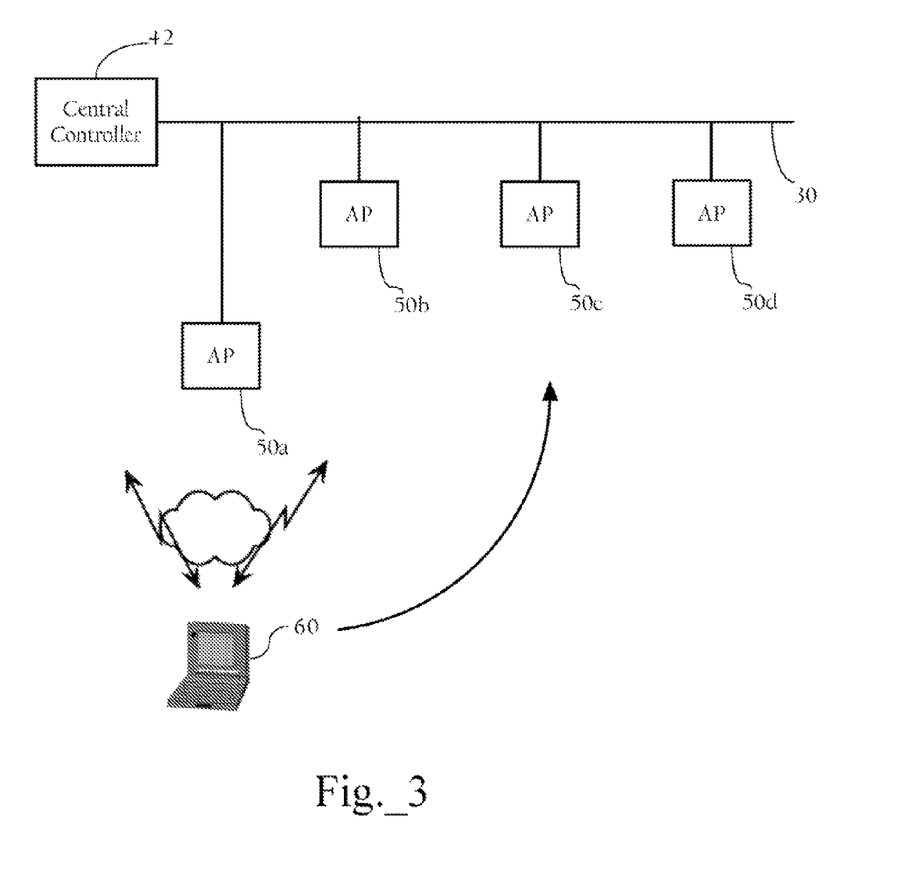
FIG. 3 illustrates an example network environment implementing a WLAN according to one implementation of the present invention.

FIG. 3 illustrates an example network environment implementing a WLAN according to one implementation of the present invention. FIG. 3 shows a central controller 42 that manages multiple wireless access points 50a-d operatively coupled to a LAN 30. FIG. 3 also shows a wireless client 60 that is currently associated with one of the wireless access points 50a. In one implementation, the central controller 42, wireless access points 50a-d, and wireless client 60 may be enabled (e.g., IEEE 802.11 Secure Fast Transitions (TGr) enabled) to perform pre-reservations. In one implementation, the current session may be a voice or video session using Unscheduled Automatic Power State Delivery (U-APSD) for packet delivery.

As FIG. 3 shows, wireless client 60 may potentially roam from wireless access point 50a to wireless access points 50b, 50c, or 50d. In one implementation, as wireless client 60 moves away from wireless access point 50a and detects that its received signal strength indicator (RSSI) signal is becoming weaker, its signal to noise ratio is decreasing, its packet error rate is increasing, its transmitted or received data rate is decreasing, or any of a number of other methods used to measure the quality of it connection to its associated wireless access point is indicating reduce quality of that connection, wireless client 60 may initiate a roaming process. In one implementation, the roaming process determines potential wireless access points to which it may roam based on observed parameters, neighbor lists, etc. In a particular implementation, a neighbor list identifies, for a given wireless access point, the neighboring wireless access points within the radio frequency (RF) range of that wireless access point. In one implementation, the neighbor list can be determined relative to a threshold signal strength level. In one implementation, the roaming process may establish pre-reservations with the available wireless access points 50b-d using a TGr mechanism. In one implementation, the wireless client may employ an over-the-air or an over-the-differential-services (DS) pre-reservation to request reservation of wireless access point resources. In particular implementations, the wireless client 60 may send a message (e.g., a resource request, message) containing the Traffic Specifications (TSPEC) of one or more current traffic streams.

Figure 4:
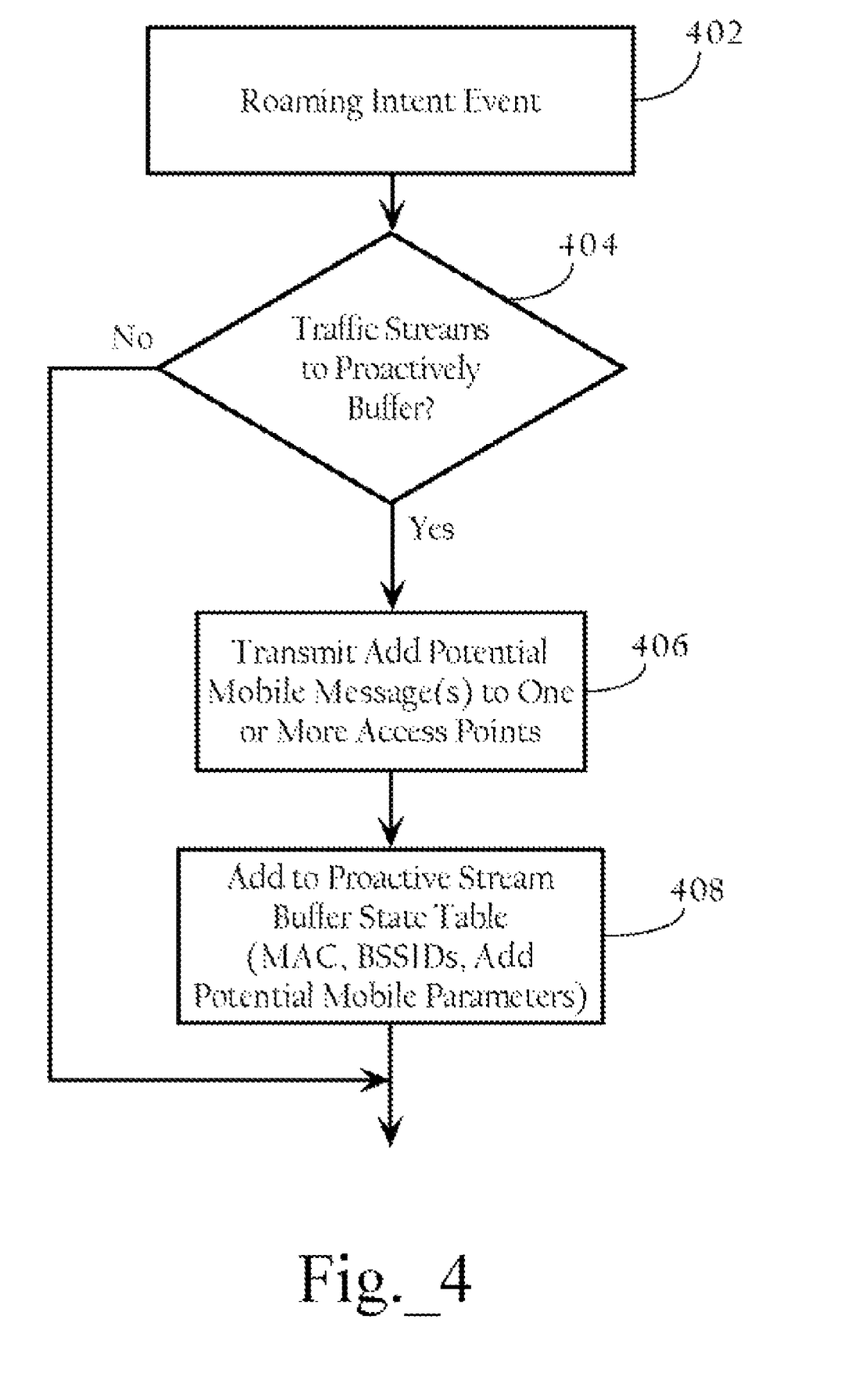
FIG. 4 illustrates an example process flow implemented at a central controller and associated with setting up proactive stream buffers at one or more potential wireless access points.

FIG. 4 illustrates an example process flow implemented at a central controller and associated with setting up proactive stream buffers at one or more potential wireless access points. As FIG. 4 shows, when a central controller 42 detects a roaming intent event (402), the central controller 42 determines whether to send the traffic streams to proactive stream buffers of one or more potential wireless access points (404). If not, the process ends. In one implementation, the central controller 42 may detect a roaming intent event, in various ways. For example, the central controller 42 may detect several processes that are indicative of a roaming intent event. Such processes may include, for example, a pre-reservation process, an association or authentication request, an increased rate of directed or broadcast probes, an exchange of encryption or security keys, etc., from the wireless client 60.

In one implementation, the central controller 42 determines whether to send one or more traffic streams of the wireless client 80 to proactive stream buffers based on the type or class of the traffic stream that is destined for the wireless client 60. In one implementation, the central controller 42 may determine the type of a traffic stream by directly examining the packets of a given traffic stream, by observing TSPEC messages, and/or by observing signaling (Session Initiation Protocol (SIP) messages) that sets up each of the traffic streams. In one implementation, the classes of traffic stream that the central controller 42 may send to the proactive stream buffers may include QoS traffic streams (e.g., voice streams, video streams, etc.), or other types of on-going traffic streams predefined by a proactive stream buffering policy.

If the central controller 42 decides to send one or more traffic streams to a proactive stream buffer, the central controller 42 sends an add potential mobile message to each of the potential wireless access points (406). In one implementation, the add potential mobile message includes an add potential mobile command that causes a given wireless access point to create a proactive stream buffer or allocate existing buffer space for receiving duplicate packets designated for the potential wireless client. In one implementation, the add potential mobile message may also include a potential wireless client identifier (e.g., a media access control (MAC) address) and potential wireless access point identifiers (e.g., Basic Service Set Identifiers (BSSIDs)). In one implementation, the add potential mobile message may also include various add potential mobile parameters such as; a buffer size to create or allocate to storing duplicate packets; a buffer age-out time; a command time-out indicating how long the add mobile command is applicable; etc. In one implementation, the add potential mobile message may be a part of any suitable control message (e.g., a Light Weight Access Point Protocol (LWAPP) control message).

In one implementation, the buffer age-out time indicates how long to store each packet stored in the proactive stream buffers, and the command time-out indicates how long the add mobile command is applicable. As described in more detail below, in one implementation, each potential wireless access point that receives an add potential mobile command applies the buffer age-out time to each received duplicate packet. As such, if the wireless client were to associate with another wireless access point, duplicate packets stored at the wireless access points not associated with the wireless access points are expired or aged-out. As described in more detail below, this ensures that each wireless access point does not store stale packets in its proactive stream buffer. In one implementation, a packet may be considered stale because the wireless client has roamed to another wireless access point. Also, even if a given wireless access point actually associates with the wireless client, the association may be delayed, as the time between the roaming intent event and the actual roam may be substantially long. After sending add potential mobile messages to the respective potential wireless access points, the central controller 42 updates a proactive stream buffer state table to identify the wireless client, one or more potential wireless access points, and traffic stream parameters (source port numbers, destination ports, protocol identifiers, etc.) (408).

Figure 5:
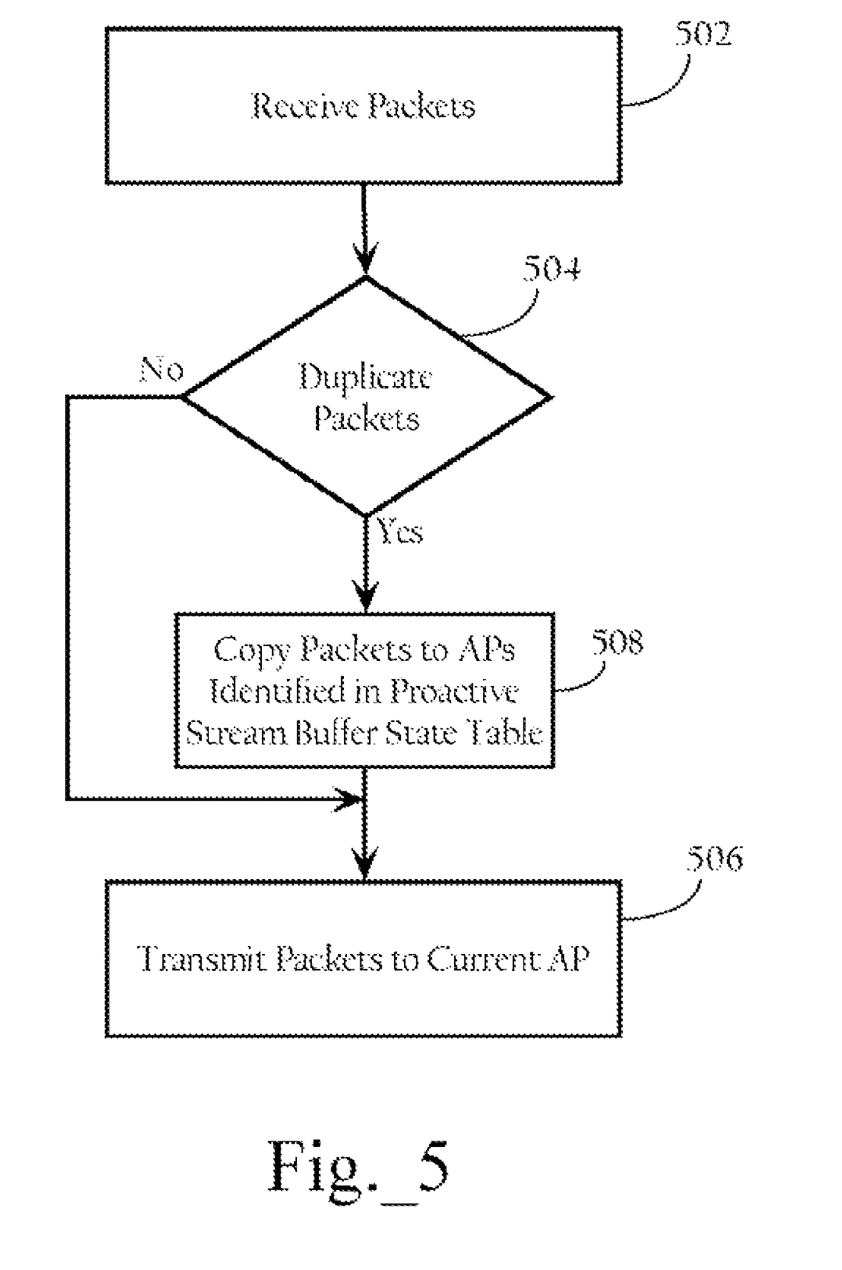
FIG. 5 illustrates an example process flow implemented at a central controller and associated with duplicating packets to be sent to proactive stream buffers of one or more wireless access points.

FIG. 5 illustrates an example process flow implemented at a central controller and associated with duplicating packets to be sent to proactive stream buffers of one or more wireless access points. As FIG. 5 shows, as the central controller 42 receives packets (502), the central controller 42 determines whether to duplicate a given set of packets (504). As indicated above, in one implementation, whether the central, controller 42 duplicates a given set of packets may depend on the class of the respective traffic stream (e.g., voice, video, etc.) or any suitable attributes of the traffic stream (e.g., traffic stream parameters), etc. In one implementation, the central controller 42 accesses the proactive stream buffer state table to determine whether received packets should be copied, and the access points to which the packets should be copied. In one implementation, the decision of whether to duplicate packets may be based on the address of the wireless client, the traffic stream parameters, port numbers, etc. If a given set of packets are not to be duplicated, the central controller 42 transmits the packets to the current wireless access point associated with the wireless client 60 (506). If the set of packets are to be duplicated, the central controller 42 duplicates/copies the packets and then transmits the duplicated packets to the potential wireless access points identified in the proactive stream buffer state table (506). In one implementation, the central controller 42 also transmits the originally received packets to the current wireless access point. In one implementation, the duplication process may begin at or after a predefined time or event (e.g., after a wireless access point acknowledges the add potential mobile message). In one implementation, the duplication process may occur for a predefined time period (e.g., a few hundred milliseconds) after the central controller 42 detects the roaming intent event (e.g., after the wireless client begins a pre-reservation process). In one implementation, the duplication process may end after a predefined event (e.g., when the wireless client roams to a new wireless access point).

In one implementation, to minimize overhead, the duplication process may be limited to a predefined number (e.g., 2-3) wireless access points for each roam. In one implementation, if the central controller 42 directs the wireless client to roam to a particular wireless access point, the central controller 42 may perform the duplication process for only the particular wireless access point. In particular implementations, the central controller 42 may select wireless access points in various ways. For example, in one implementation, the central controller 42 may perform the duplication process for only the neighboring access points of the current, access point. In one implementation, the central controller 42 may perform the duplication process for only those access points that the wireless client has probed or pre-reserved resources. In one implementation, the central controller 42 may perform the duplication process for only those access points that detect the wireless client, etc.

In one implementation, when a given wireless access point receives duplicate packets from the central controller 42, the wireless access point does not put the packets in any transmission queues to be transmitted over the air until after the wireless access point has actually associated with the wireless client. The wireless access point stores the packets in its proactive stream buffer with a time stamp until the packets either expire (per the age-out time) or are ready to be merged into a transmission queue. In one implementation, the proactive stream buffer includes an age-out mechanism that ages a packet out of the buffer and drops the packet from any further consideration after an age-out time. In one implementation, the age-out time is at least greater than a packetization interval of a traffic stream. In one implementation, the age-out time may be based on a sum of a packetization period, an average packet transmission delay at the wireless access point queues, and a codec jitter tolerance. As described above, the age-out mechanism ensures that the proactive stream buffer of a given wireless access point does not have stale packets. It would be useless to transmit stale packets if the wireless client were to associate with another wireless access point.

In one implementation, after the central controller 42 determines that the wireless client has roamed to a new wireless access point (e.g., to wireless access point 50b), the central controller 42 sends a delete potential mobile message to the other wireless access points (e.g., wireless access points 50c and 50d) to clear their state tables (potential mobile tables) and to clear their proactive stream buffers for the corresponding wireless client.

Figure 6:
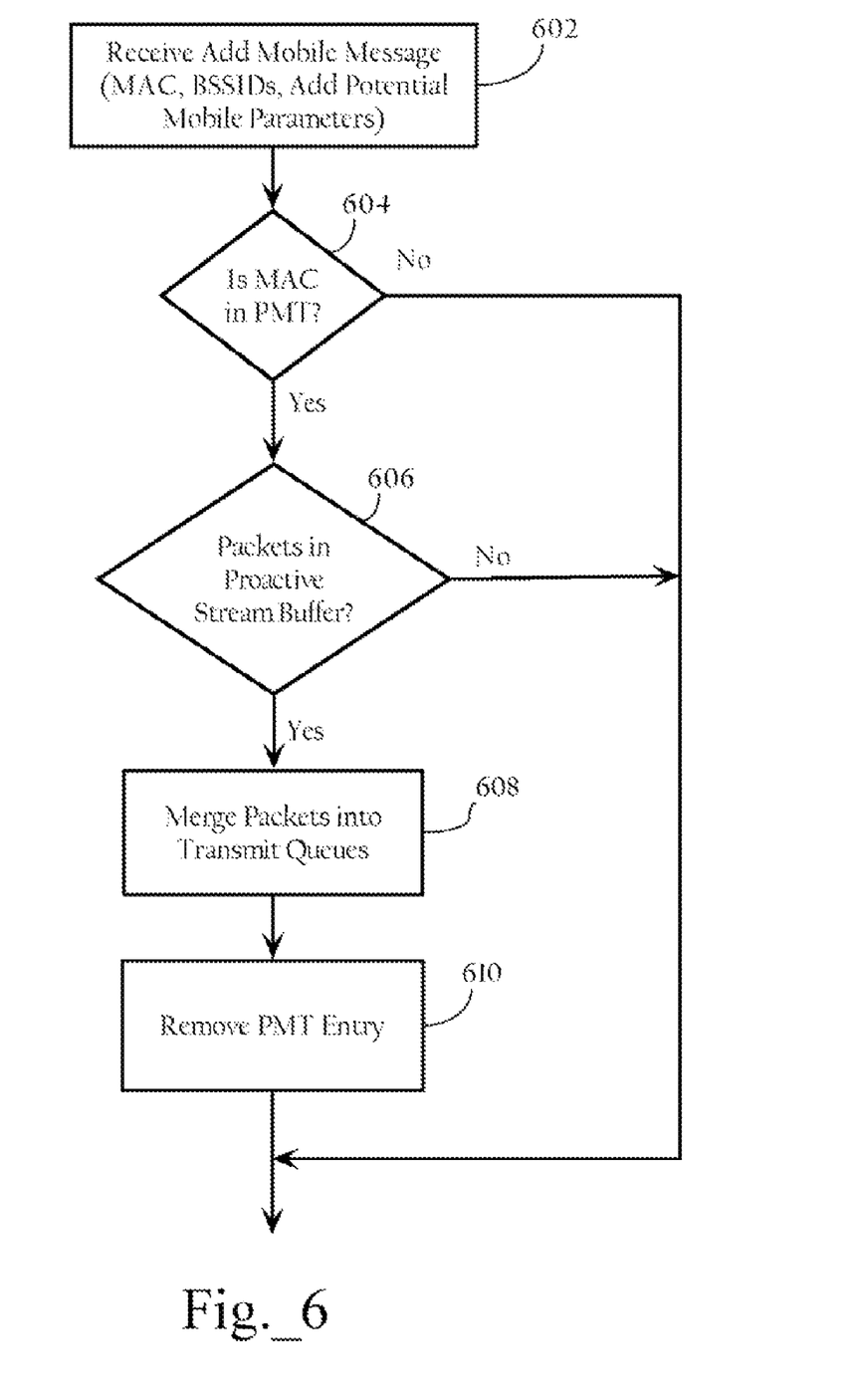
FIG. 6 illustrates an example process flow implemented at a wireless access point and associated with receiving an add mobile message.

FIG. 6 illustrates an example process flow implemented at a wireless access point, and associated with receiving an add mobile message. An add mobile message is transmitted to an access point to command the access point to establish an association with a wireless client identified in the message. As FIG. 6 shows, when the wireless access point receives an add mobile message for a particular wireless client (602), the wireless access point determines if the MAC address of the wireless client is in its potential mobile table (PMT) (604). In one implementation, the PMT indexes the proactive stream buffer of the wireless access point. In one implementation, the wireless access point updates its PMT when a given wireless access point receives an add potential mobile command. If the wireless access point had not received an add potential mobile command for the wireless client, if there has been a command time out, or if the central controller 42 had instructed the wireless client to delete the PMT entry of the wireless client, the MAC address would not be in the PMT and the process would end.

If the MAC address is in the PMT, the wireless access point determines if the duplicate packets are in the proactive stream buffer (606). If not, the process ends. If the duplicate packets are in the proactive stream buffer, the wireless access point merges the packets into the transmission queues (608). In one implementation, the merging process may involve putting the packets in the proactive stream buffer at the end of the transmission queue. In one implementation, if the wireless access point, maintains the arrival times of the packets, the merging process may involve inserting the packets in the proactive stream buffer at the appropriate places in the transmission queue. After the wireless access point has merged the duplicate packets for the wireless client, the wireless access point then removes the PMT entry for that wireless client (610).

As a result, the wireless client is able to roam with minimal packet loss. The implementations described herein are particularly useful when the wireless client roaming speeds are high or if the distance between the packet delivery point (e.g., the wireless access point) and the control port (usually at the central controller) is significant. In some scenarios, it is possible that a wireless client may receive duplicate packets if the aging-out mechanism at a newly associated wireless access point did not drop a packet that was already sent from the previously associated wireless access point. In one implementation, a processing mechanism, may detect and filter out duplicate packets.

As described below in connection with FIGS. 7-9, embodiments of the present invention may be used in connection with any suitable wireless network environment such as wireless mesh networks.

D. Wireless Mesh Networks

Figure 7:
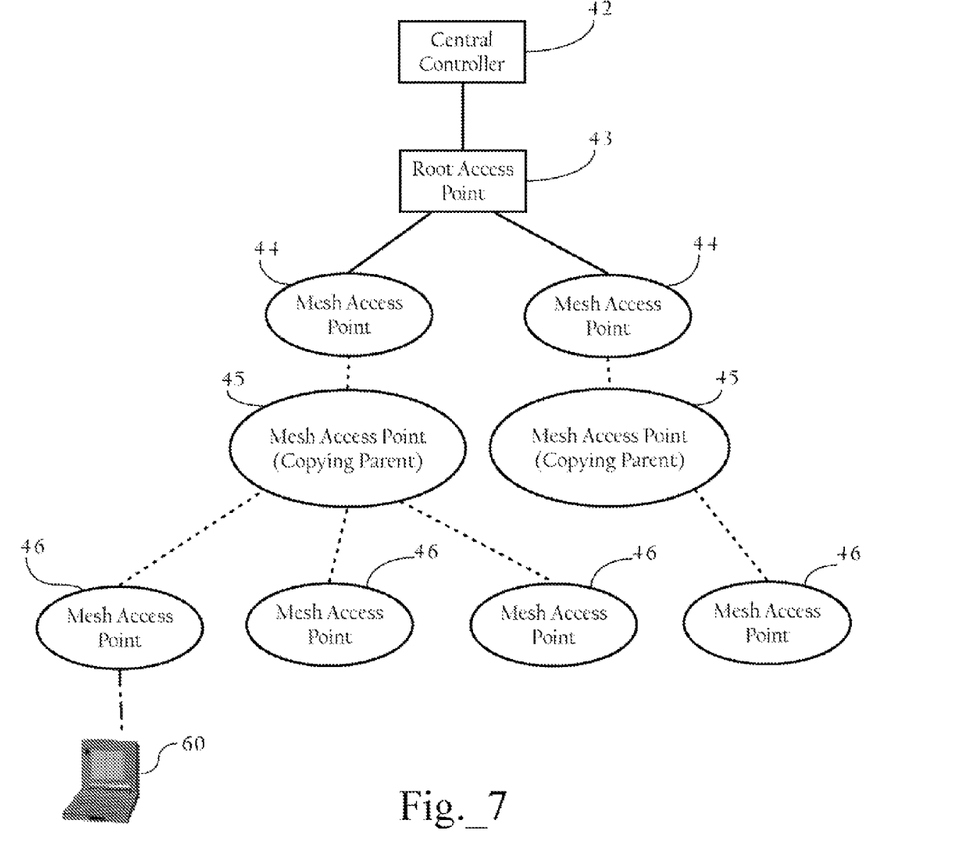
FIG. 7 illustrates example components in a mesh network system.

FIG. 7 illustrates example components in a mesh network system. In one implementation, the wireless mesh network includes a central controller 42, a root access point (RAP) 43, and a plurality of child wireless mesh access points 44, 45, and 48 operable to associate with a wireless client 80. In one implementation, the mesh access points are logically arranged in a hierarchy for purposes of routing traffic to the RAP 43, and on to a network. In particular implementations, this hierarchy of mesh access points may be either dynamically configured and shifted based on the discovery of wireless management messages between wireless mesh access points, or may be statically configured. In one implementation, a hierarchical architectural overlay is imposed on the mesh network of mesh access points to create a downstream direction towards leaf access points 46, and an upstream direction toward the RAP 43.

Figure 8:
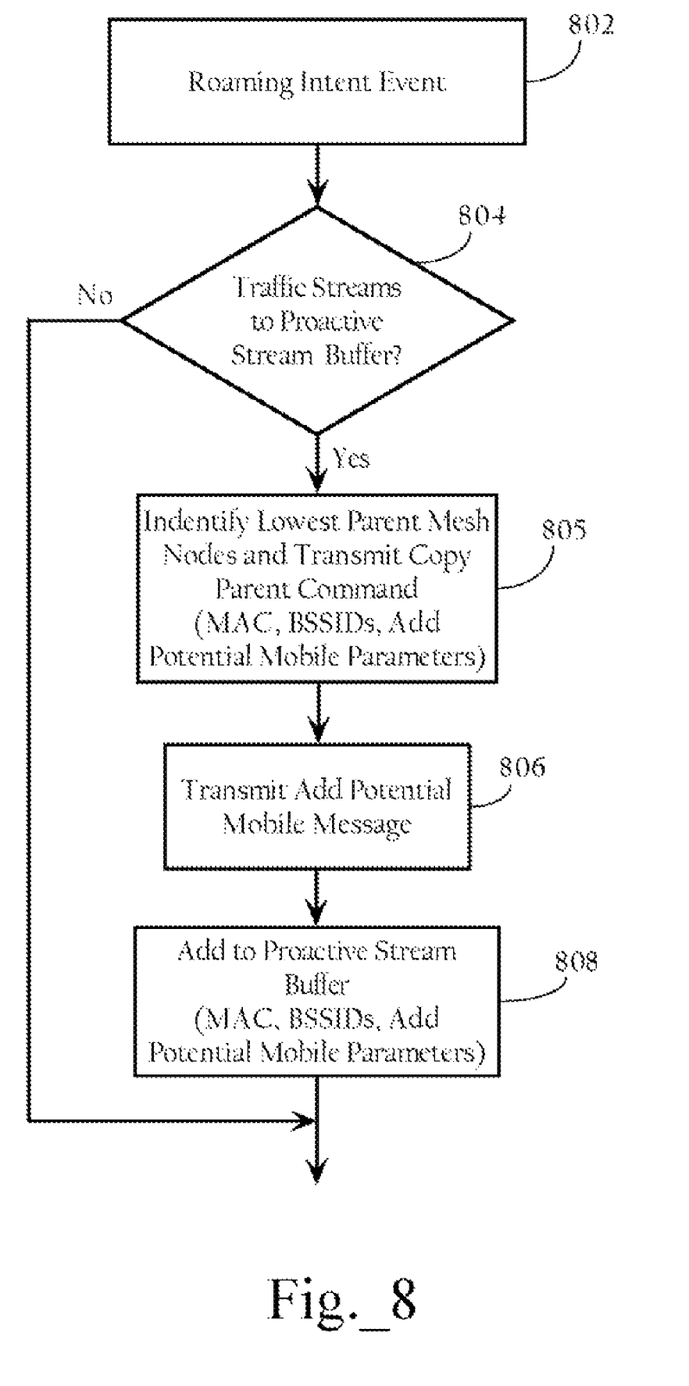
FIG. 8 illustrates an example process flow associated with setting up proactive stream buffers at one or more potential wireless access points in a mesh network system.

FIG. 8 illustrates an example process flow associated with setting up proactive stream buffers at one or more potential wireless access points in a mesh network system. As described in more detail below, the process described in connection to FIG. 8 is similar to the process described in connection to FIG. 4, except that the central controller 42 causes one or more lowest parent mesh access points, referred to as copy parents, to perform the duplication process. In one implementation, these copy parents are the parent mesh access points of potential mesh access points to which a given wireless client may roam.

In one implementation, when the central controller 42 detects a roaming intent event (802), the central controller 42 determines whether to send the traffic streams to proactive stream buffers of one or more potential mesh access points (804). If not, the process ends. If the central controller 42 decides to send one or more traffic streams to a proactive stream buffer, the central controller 42 identifies one or more lowest parent mesh access points to which the wireless client may roam and transmits a copy parent, command and traffic stream to the identified lowest parent mesh nodes (805). In one implementation, the copy parent command causes the copy parent to duplicate the packets of traffic stream and sends the duplicate packets and an add potential mobile message to the potential mesh access points (806). In one implementation, the add potential mobile message includes an add potential mobile command that causes the mesh points to create a proactive stream buffer to receive duplicate packets designated for the potential wireless client. In one implementation, the add potential mobile message also indicates the potential wireless client (e.g., with a media access control (MAC) address), BSSIDs of potential mesh access points, and various add potential mobile parameters such as how large of a buffer to create, a buffer age-out time indicating how long to store each packet stored in the proactive stream buffers, a command time-out indicating how long the add mobile command is applicable, etc. After the copy parent sends any duplicate packets to any proactive stream buffers and sends add potential mobile messages to the respective potential wireless access points, the copy parent updates a proactive stream buffer state table to identify the wireless client, potential wireless access points, and traffic stream parameters (source port numbers, destination ports, protocol identifiers, etc.) (808).

Figure 9:
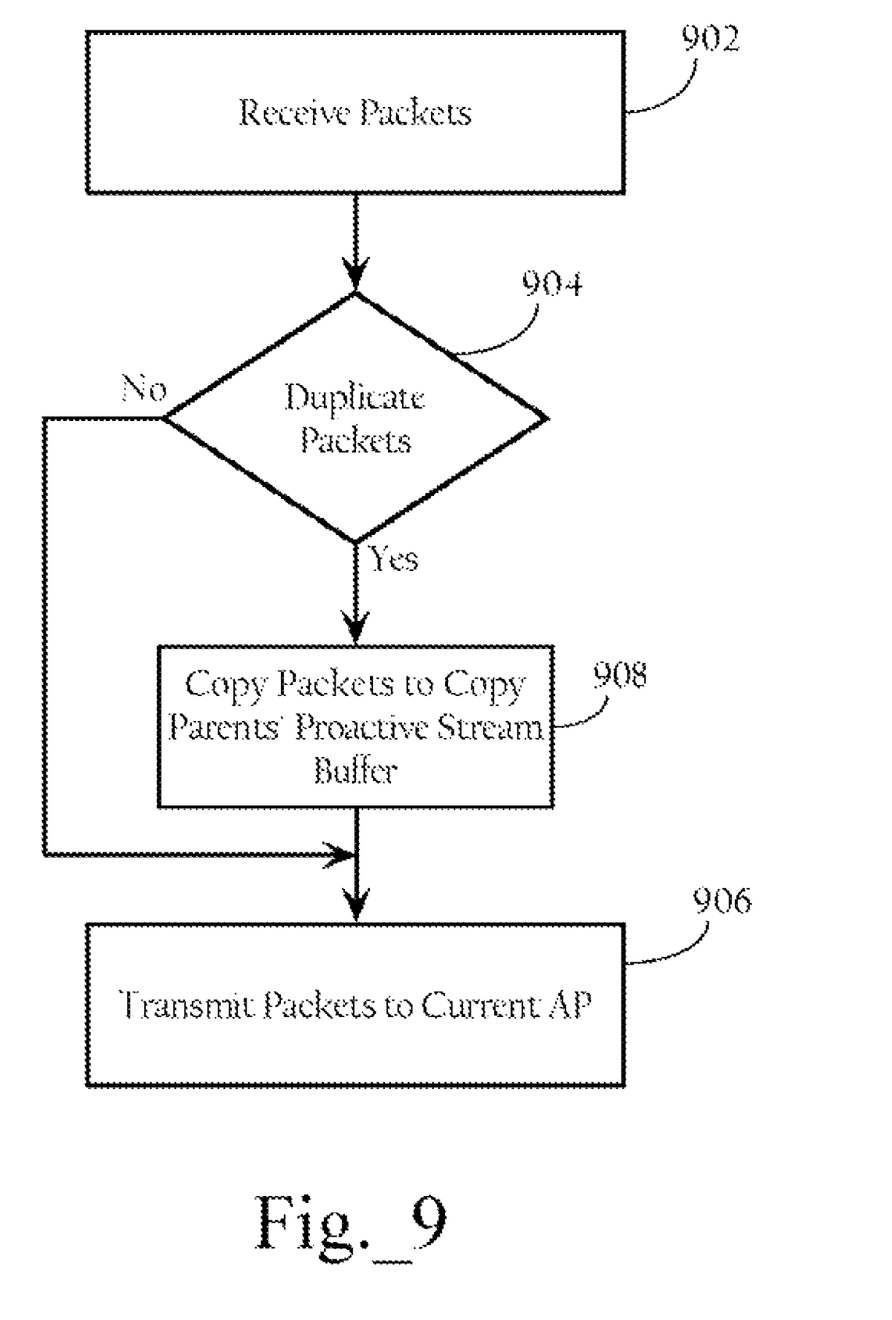
FIG. 9 illustrates an example process flow associated with duplicating packets to be sent to proactive stream buffers of one or more wireless access points in a mesh network system.

FIG. 9 illustrates an example process flow associated with duplicating packets to be sent to proactive stream buffers of one or more wireless access points in a mesh network system. Similar to the process described in connection with FIG. 5, as the central controller receives packets (902), the central controller 42 determines whether to duplicate a given set of packets (904). If a given set of packets are not to be duplicated, the central controller 42 transmits the packets to the mesh access point currently associated with the wireless client 60 (906). If the set of packets are to be duplicated, the central controller 42 duplicates or copies the packets and then transmits the packets to the one or more copy parents which in turn duplicates the packets and sends the duplicate packets to the potential wireless access points to be stored in their respective proactive stream buffers (906). In one implementation, the central controller 42 also transmits the packets to the current wireless access point. When a given potential mesh access point receives the duplicate packets, the potential mesh access point carries out a process similar the process described in connection to FIG. 6.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more non-transitory media for execution and when executed operable to:

responsive to indications of roaming intent of a wireless client relative to a currently associated mesh access point, determine if a traffic stream associated with the wireless client is to be proactively buffered by one or more potential mesh access points;

identify one or more parent mesh access points in a mesh network based on potential mesh access points to which the wireless client can roam;

transmit a first command operative to cause the one or more parent mesh access points to: transmit a second command to the one or more potential mesh access points to cause the mesh access points to create a proactive stream buffer or allocate an existing proactive stream buffer for proactively buffering packets of the traffic stream;

duplicate received packets of the traffic stream destined for the wireless client; and transmit the duplicate packets to the one or more parent mesh access points; wherein the first command is further operative to cause the one or more parent mesh access points to:

duplicate the received packets destined for the wireless client;

transmit the duplicate packets to the potential mesh access points for storage in a proactive stream buffer.

2. The logic of claim 1 wherein the logic is further operable to transmit the received packets to the currently associated mesh access point.

3. The logic of claim 1 wherein the logic is further operable to cause the potential mesh access points to transmit the duplicated packets to the wireless client only after associating with the wireless client.

4. The logic of claim 1 wherein the traffic stream associated with the wireless client is to be proactively buffered if the traffic stream is of a predefined class.

5. The logic of claim 1 wherein the traffic stream associated with the wireless client is to be proactively buffered if the traffic stream is a voice traffic stream or a video traffic stream.

6. The logic of claim 1 wherein the logic is further operable to detect an indication of a roaming intent based on detection of a pre-reservation process initiated by the wireless client.

7. The logic of claim 1 wherein the second command causes the potential mesh access points to expire duplicate packets after a predefined time period.

8. The logic of claim 1 wherein the second command causes the potential mesh access points to expire the second command after a predefined time period.

9. A method comprising:

responsive to indications of roaming intent of a wireless client relative to a currently associated mesh access point, determining if a traffic stream associated with the wireless client is to be proactively buffered by one or more potential mesh access points;

identifying one or more parent mesh access points in a mesh network based on potential mesh access points to which the wireless client can roam;

transmitting a first command operative to cause the one or more parent mesh access points to: transmit a second command to the one or more potential mesh access points to cause the mesh access points to create a proactive stream buffer or allocate an existing proactive stream buffer for proactively buffering packets of the traffic stream;

duplicating received packets of the traffic stream destined for the wireless client; and transmitting the duplicate packets to the one or more parent mesh access points; wherein the first command is further operative to cause the one or more parent mesh access points to:

duplicate the received packets destined for the wireless client;

transmit the duplicate packets to the potential mesh access points for storage in a proactive stream buffer.

10. The method of claim 9 further comprising transmitting the received packets to the currently associated mesh access point.

11. The method of claim 9 further comprising causing the potential mesh access points to transmit the duplicated packets to the wireless client only after associating with the wireless client.

12. The method of claim 9 wherein the traffic stream associated with the wireless client is to be proactively buffered if the traffic stream is of a predefined class.

13. The method of claim 9 wherein the traffic stream associated with the wireless client is to be proactively buffered if the traffic stream is a voice traffic stream or a video traffic stream.

14. The method of claim 9 further comprising detecting an indication of a roaming intent based on detection of a pre-reservation process initiated by the wireless client.

15. The method of claim 9 wherein the second command causes the potential mesh access points to expire duplicate packets after a predefined time period.

16. The method of claim 9 wherein the second command causes the potential second access points to expire the second command after a predefined time period.

* * * * *